Aug. 21, 1934.  V. C. BRYANT  1,970,883
ADJUSTABLE INCLINOMETER
Filed April 20, 1933
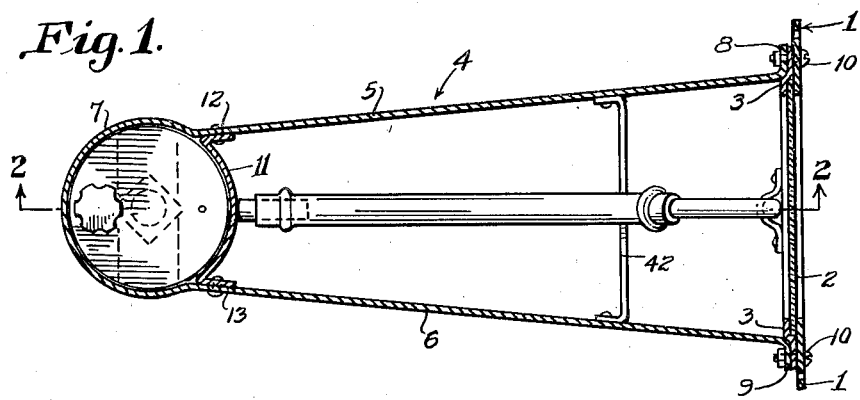
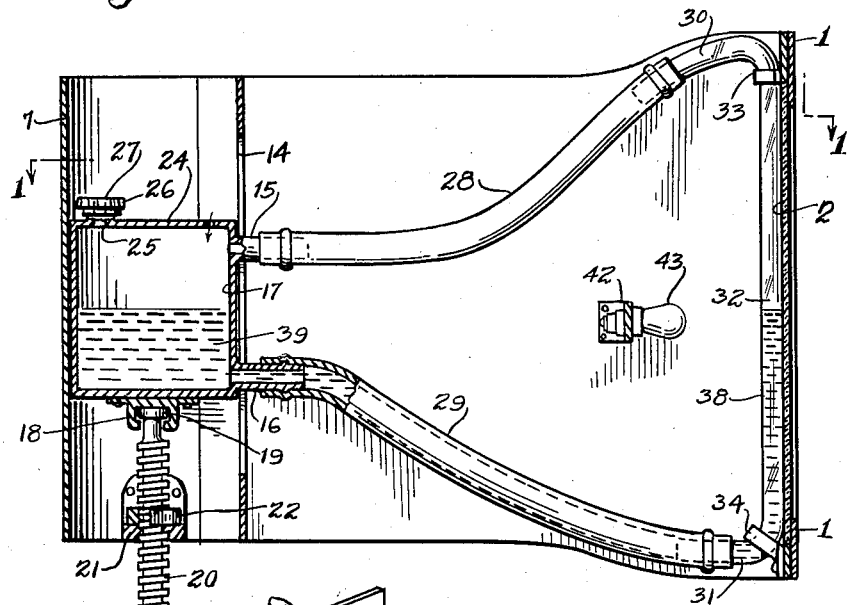
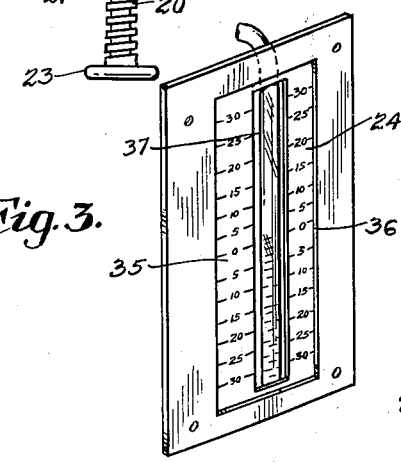
Inventor
VIRGIL C. BRYANT
By Mason Fenwick Lawrence
Attorneys Patented Aug. 21, 1934

1,970,883

UNITED STATES PATENT OFFICE 1,970,883

ADJUSTABLE INCLINOMETER

Virgil C. Bryant, Gooding, Idaho

Application April 20, 1933, Serial No. 667,128

7 Claims. (Cl. 33—209)

This invention relates to inclinometers or devices for measuring inclination generally, and more particularly to inclinometers of the liquid level type adapted for use on motor vehicles or aircraft to indicate the inclination of the vehicle to the horizontal at any time.

The main object of the invention is to provide a device of the character referred to which can be very cheaply manufactured in quantities, and which is capable of being installed as a unit very quickly upon vehicles of the automobile or aircraft type, or upon any other type of vehicle subject to movements of inclination to the horizontal.

Another object of the invention is to provide a device of this type, with means whereby the liquid level can be adjusted to correct the level indications so long as any liquid above a predetermined amount remains therein.

Other objects of the invention will become apparent as the detailed description thereof proceeds.

In the drawing:

Figure 1 is a horizontal section taken on a line 1—1 of Figure 2;

Figure 2 is a vertical longitudinal section of the instrument taken on the line 2—2 of Figure 1;

Figure 3 is a fragmentary perspective of the indicating part of the inclinometer; and Figure 4 is a fragmentary vertical section of part of the instrument designed to steady the indications thereof.

As shown in the drawing, the device comprises a substantially rectangular frame 1 adapted to be suitably connected to the dashboard of an aircraft or motor vehicle, or to any normally vertically fixed part of any other vehicle subject to rolling or pitching movement, or movements, which incline the vehicle from the horizontal. The frame 1 has an indicator plate 2 suitably secured thereto by a clamping frame 3 of substantially the same outline as the frame 1. An open ended casing designated generally by the reference numeral 4 and formed preferably from a single piece of sheet metal has the sides 5 and 6 somewhat inclined toward each other and shaped to form a cylinder 7.

The ends of the sides 5 and 6 are turned outwardly to form flanges 8 and 9, respectively, adapted to seat against clamping frame 3 and the indicator plate 2. The plate 2 and frame 3 and flanges 8 and 9 are rigidly secured to each other by any suitable means, such as the bolts 10. The cylindrical end 7 of the casing 4 is completed across the sides 5 and 6 by means of an arcuate segment 11 which has its opposite edges turned rearwardly to form flanges 12 and 13 which may be welded or riveted or otherwise secured in proper location on the sides 5 and 6. The arcuate segment 11 must, of course, be positioned so that it forms a smooth continuation of the wall of the cylinder 7. The segment 11 is provided with a slot 14 extending throughout the greater part of its length parallel to the axis of the cylinder 7. This slot 14 is made just sufficiently wide to permit the snug sliding movements therein of the pipes 15 and 16 which project radially from a container 17 which is mounted to slide axially as a piston in the cylinder 7.

The container 17 has a socket 18 secured to the bottom thereof to receive the end 19 of an adjusting screw 20 which is screwthreaded into a bridge 21 extending diametrically across the cylinder 7 at the lower end thereof. A lock nut 22 may be used to fix the screw 20 in adjusted position; and the screw 20 is provided with a handwheel 23 at its outer end to facilitate rotation thereof in effecting axial adjustment of the container 17. The container 17 is provided in its top 24 with a suitable aperture 25 adapted to be closed by a screw cap 26 having a small vent opening 27 extending therethrough.

The pipes 15 and 16 are connected by flexible tubes 28 and 29, respectively, to the bent ends 30 and 31 of a transparent indicating tube 32 which is fixed by clamps 33 and 34 to the back of the frame 1. The tube 32 is arranged centrally of the frame 1 and parallel to the vertical sides of said frame. In order to give an indication of level, scales 35 and 36 reading in percentage of grade are formed on opposite sides of a slot 37 of the indicator plate 2. These scales 35 and 36 may be formed directly on the indicator plate 2 which is preferably transparent. However, the plate 2 may be made of opaque material; but, in this case the plate would have to be provided with a slot to render visible the movements of the end of a column of liquid 38 in the tube 32.

The indications on the scale plate 2 run in opposite directions from the center thereof and are preferably calibrated in terms of percent of grade. The indication of inclination is effected by means of the liquid 39 contained in the piston container 17, the lower tube 29 and the tube 32. This liquid is preferably colored so as to increase its visibility and is preferably slightly viscous in order to obviate jerky movements and violent oscillations. A suitable liquid for this kind of indicator is an alcoholic solution of glycerine and analin.

To prevent surging of the liquid in the indicator part of the apparatus, the lower bend 40 of the tube 32 is constructed to form a restricted passage 41 which retards the flow of indicating liquid in either direction under any disturbing forces which would otherwise set up violent oscillations and give unsteady readings of inclination. The upper half of the tubes and the piston contain air at normal pressure and thereby form a sealed circulatory system so that as the instrument or vehicle on which it is mounted is tilted, the end of the liquid column in the indicator 32 rises or falls therein against the scales 35 and 36 to indicate the percentage of grade. The dial or indicator part of the plate 2 can be calibrated by test to read in such percentages.

It is obvious that the container 17 may be readily raised in the cylinder 7 to render its filling cap 26 accessible for filling as much as may be found necessary or desirable. When so filled, the piston container may be adjusted to such position that the end of the liquid column in the tube 32 shall be opposite the center zero mark of the scales formed on the plate 2.

The converging sides 5 and 6 and the cylindrical continuation 7 thereof form a rigid framework which protects the several parts from injury. This framework may be provided with a cross strut 42 adapted to support a light 43 for illuminating the indicator dial and tube from the rear whenever found necessary or desirable.

It is thought that the invention and numerous of its attendant advantages will be understood from the foregoing description and it is obvious that numerous changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. An inclinometer comprising: a plate provided with a scale reading in opposite directions from a fixed mark thereon, a transparent tube mounted adjacent said scale, framework connected to said plate, a container for indicating liquid mounted on said framework for adjustment in the same plane as said tube, and flexible pipes connecting the upper and lower ends of the tube to the upper and lower ends of the container, and means for adjusting the container in said framework.

2. An inclinometer comprising: a plate provided with a scale reading in opposite directions from a fixed zero mark, a casing secured to said scale plate, a transparent indicator tube arranged along side said scale, a cylinder formed in said casing, a cylindrical liquid container slidable as a piston in said cylinder, flexible pipes connecting the upper and lower ends of said container with the upper and lower ends of said tube, and means for adjusting said container in said cylinder, said cylinder and tube having their axes lying in the same plane.

3. An inclinometer comprising: a plate provided with a scale reading in opposite directions from a fixed zero mark, a casing secured to said scale plate, a transparent indicator tube arranged along side said scale, a cylinder formed in said casing, a cylindrical container slidable as a piston in said cylinder, flexible pipes connecting the upper and lower ends of said container with the upper and lower ends of said tube, means for adjusting said container in said cylinder, said cylinder and tube having their axes lying in the same plane, and means for locking the container in adjusted position.

4. An inclinometer comprising: framework having a scale formed thereon, a transparent tube mounted on said framework alongside the scale, a container for liquid adjustable in the framework in a plane containing the axis of said tube, fluid conducting means connecting the upper and lower ends of said tube to the upper and lower ends of said container, means for adjusting said container, and means for locking the container in adjusted position.

5. An inclinometer comprising: a frame having a scale plate secured to one end thereof, said plate having a scale reading in opposite directions from a fixed mark thereon, a transparent tube secured to said frame alongside the scale, a cylinder formed in said frame and having its axis substantially parallel to the axis of said tube, a cylindrical container slidable in said cylinder, and fluid conducting means connecting the upper and lower ends of said container to the upper and lower ends of said tube.

6. An inclinometer comprising: a frame having a scale plate secured to one end thereof, said plate having a scale reading in opposite directions from a fixed mark thereon, a transparent tube secured to said frame alongside the scale, a cylinder formed in said frame and having its axis substantially parallel to the axis of said tube, a cylindrical container slidable in said cylinder, fluid conducting means connecting the upper and lower ends of said container to the upper and lower ends of said tube, a screw having one end thereof rotatably connected to the bottom of said container to adjust the same in said frame, and means for locking the screw and container in adjusted position in said frame.

7. An inclinometer comprising: a frame having a scale plate secured to one end thereof, said plate having a scale reading in opposite directions from a fixed mark thereon, a transparent tube secured to said frame alongside the scale, a cylinder formed in said frame and having its axis substantially parallel to the axis of said tube, a cylindrical container slidable in said cylinder, fluid conducting means connecting the upper and lower ends of said container to the upper and lower ends of said tube, a bridge extending across the lower end of said cylinder, a screw threaded into said bridge, and having its upper end pivotally connected to the bottom of said container, and a lock nut cooperating with said bridge for securing the container in any desired position of adjustment.

VIRGIL C. BRYANT.